(12) United States Patent
Lamboglia

(10) Patent No.: US 11,060,556 B2
(45) Date of Patent: Jul. 13, 2021

(54) ACTIVE WHEEL HUB BEARING

(71) Applicant: Aktiebolaget SKF, Gothenburg (SE)

(72) Inventor: Francesco Lamboglia, Pinerolo (IT)

(*) Notice: Subject to any disclaimer, the term of this patent is extended or adjusted under 35 U.S.C. 154(b) by 0 days.

(21) Appl. No.: 16/392,698

(22) Filed: Apr. 24, 2019

(65) Prior Publication Data
US 2019/0322133 A1 Oct. 24, 2019

(30) Foreign Application Priority Data
Apr. 24, 2018 (IT) .................. 102018000004797

(51) Int. Cl.
*F16C 19/52* (2006.01)
*B60B 27/00* (2006.01)
*F16C 19/18* (2006.01)

(52) U.S. Cl.
CPC ........ *F16C 19/522* (2013.01); *B60B 27/0068* (2013.01); *F16C 19/184* (2013.01); *F16C 2326/02* (2013.01)

(58) Field of Classification Search
CPC ............................ F16C 19/522; F16C 2202/36
See application file for complete search history.

(56) References Cited

U.S. PATENT DOCUMENTS

| | | | |
|---|---|---|---|
| 6,535,135 B1 * | 3/2003 | French | B61K 9/04 340/682 |
| 7,628,540 B2 * | 12/2009 | Iwamoto | F16C 19/185 384/448 |
| 7,771,124 B2 * | 8/2010 | Okada | F16C 19/186 384/448 |
| 2004/0263024 A1 | 12/2004 | Maffee et al. | |

FOREIGN PATENT DOCUMENTS

| | | |
|---|---|---|
| DE | 102015214028 | 7/2015 |
| EP | 1635079 | 3/2006 |
| EP | 2302242 | 3/2011 |
| JP | 2017114375 | 6/2017 |

OTHER PUBLICATIONS

International Search Report for Italy Patent Application No. 201800004797 dated Jan. 24, 2019.

* cited by examiner

*Primary Examiner* — James Pilkington
(74) *Attorney, Agent, or Firm* — Reed Smith LLP

(57) ABSTRACT

A rolling bearing of a wheel hub group for motor vehicles, equipped with a stationary radially outer ring and with respective radially outer raceways, a pair of rotatable radially inner rings equipped with respective radially inner raceways, and two rows of rolling bodies positioned between the corresponding inner and outer raceways. The rolling bearing is also equipped with a piezoelectric actuator housed in a seat of the radially outer ring, in a symmetrical position relative to the raceways, and capable of varying the strain behavior of the radially outer ring.

10 Claims, 3 Drawing Sheets

ACTIVE WHEEL HUB BEARING

CROSS-REFERENCE

This application claims priority to Italian patent application no. 102018000004797 filed on Apr. 24, 2018, the contents of which are fully incorporated herein by reference.

TECHNOLOGICAL FIELD

The present invention relates to a rolling bearing unit belonging to a wheel hub group. In particular, the invention proposes to achieve a considerable reduction in rolling friction without thereby compromising other characteristics of the bearing such as the mechanical strength and durability. The present invention is particularly, although not exclusively, suitable for wheel hub groups of motor vehicles, these groups being provided with rolling bearings. Even more particularly, the invention relates to applications in which the outer ring of the bearing is stationary while the inner rings of the bearing are rotatable. The invention is also suitable for any type of rolling bodies (balls, rollers, tapered rollers, and others).

BACKGROUND

As is known, the reduction of pollution and fuel consumption at the present time are the main challenges facing the motor industry, as a result of current and forthcoming regulations and the requirements of purchasers. In view of this, manufacturers of vehicles, including both passenger cars and commercial vehicles, are requesting an increasing number of bearings for low-friction wheel hub groups.

It is also known that the losses of mechanical power due to friction of bearing units are due to the contact between the rolling bodies and the respective raceways of bearing rings (rolling friction), contacts related to the geometry of these components, and the sliding contact of the inner seals of the bearing (sliding friction).

Up to the present time, the producers of bearing units have proposed solutions which offer only a limited reduction of the friction. This is achieved by optimizing the sealing and design of the inner geometry of the bearing. The reason why optimization offers a limited reduction of the friction relates to the inevitable compromise to which these solutions must be subject in order to avoid adversely affecting other aspects of the performance of the bearings such as the service life and the rigidity.

A solution is proposed in the patent document DE102015214028 A1. A description is given of a wheel hub group whose bearing has two rotatable inner rings positioned on the hub, a stationary outer ring integral with the fixed structure of the vehicle, and two rows of rolling bodies between the outer ring and each inner ring.

According to the invention, an actuator is integrated into the fixed structure of the vehicle and can axially move the two axially movable elements that form part of the outer ring of the bearing. Thus, the force acting between the rings of the bearing and the rolling bodies can be modified. An axial outward movement of the axially movable elements increases the pressure on the row of rolling bodies positioned radially between the outer ring and the respective inner ring. This stiffening of the bearing results in an increase in the load capacity, but also an increase in friction. The pre-loading force of the bearing can thus be adjusted according to the driving behavior, and therefore according to the load conditions of the bearing. When driving in a straight line, it is preferable to have a low force on the bearing in order to minimize friction losses and thus save fuel.

Conversely, when the vehicle is cornering, the force on the wheel bearing is preferably increased, in order to increase the load capacity of the bearing and thus the stability of the vehicle.

The actuator comprises a piezoelectric element which is positioned axially between the two axially movable elements. In particular, the application of a voltage to the piezoelectric actuator causes a change in the length of the actuator, which in turn causes the axially movable elements to be moved axially outwards. By using a piezoelectric actuator, it is possible to achieve short reaction times, compared with a change of shape.

Despite the theoretical advantages that this solution would appear to have, in practice it has a considerable degree of complexity as regards both the design of the bearing unit and the feasibility of production and assembly. Indeed, this solution is notable for the use of a larger number of components than in the arrangements of present-day solutions. Furthermore, some components have to be designed "ad hoc" to implement this solution, giving rise to the aforementioned difficulties, and making this solution less attractive in various respects, including economically.

Consequently, there is a need to design a bearing unit of a wheel hub group that is free of the afore mentioned drawbacks. In particular, there is a need to reduce the size of the frictional forces of the bearing, without adversely affecting the other characteristics of the bearing itself (service life and mechanical strength), and without any need for using complex and economically uncompetitive solutions.

SUMMARY

One object of the present invention is to provide a rolling bearing unit for a wheel hub group allowing a large reduction in the friction produced within the bearing itself, without compromising the other mechanical performance aspects of the bearing, such as the mechanical strength and service life. This bearing unit may be defined as "active" because the active response of the bearing can improve the handling of the vehicle, and particularly of the whole wheel hub group.

The object of the present invention is achieved by using a piezoelectric element which is positioned inside the radially outer ring of the bearing unit and which may act as an actuator and/or a sensor. In particular, the application of a voltage to the piezoelectric actuator causes a change in the length of the actuator itself, which in turn changes the strain behavior of the radially outer ring, and consequently the force that the latter exerts on the rolling bodies via its raceways.

According to another object, the bearing unit according to the invention is provided with components (radially outer ring, radially inner rings and rolling bodies) which are entirely standard, and therefore require no special design and present no difficulty for production and/or assembly.

Thus, according to the present invention, a description is given of a rolling bearing unit for a wheel hub group provided with a radially outer ring, a pair of radially inner rings and two rows of rolling bodies, all having known characteristics according to current production standards. Also provided is a piezoelectric actuator configured so as to be able to vary the strain behavior of the radially outer ring, the whole having the characteristics stated in the independent product claim attached to the present description.

Additionally, again according to the present invention, a description is given of a system for the active control of the bearing unit, having the characteristics stated in the independent system claim attached to the present description.

Further preferred and/or particularly advantageous embodiments of the invention are described according to the characteristics stated in the attached dependent claims.

BRIEF DESCRIPTION OF THE DRAWINGS

The invention will now be described with reference to the attached drawings, which show some non-limiting examples of embodiment, in which.

DETAILED DESCRIPTION

Figure 1:
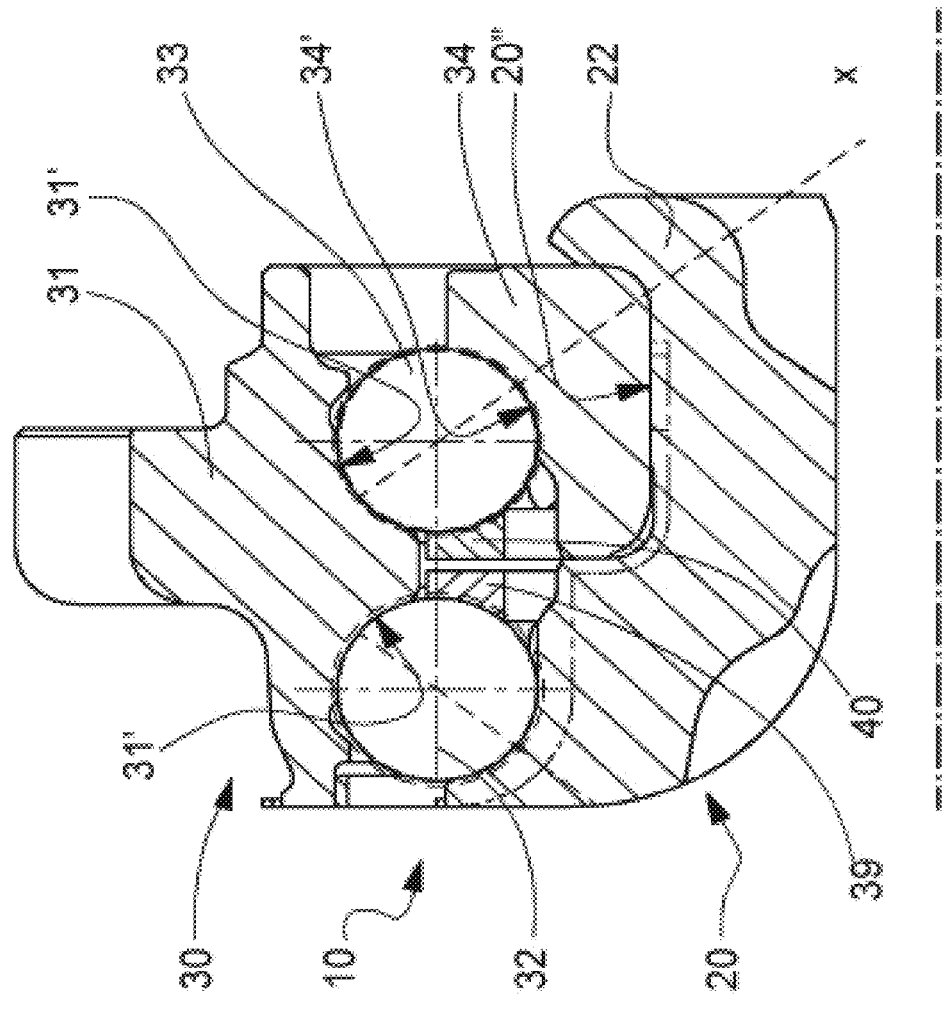
FIG. 1, in partial axisymmetric section, shows a detail of an assembled wheel hub group.

With reference now to FIG. 1, a wheel hub group is indicated as a whole by 10. The figure shows a detail of an example of configuration. As stated in the introduction, the invention is applicable not only to the configuration described below but more generally to any wheel hub group for motor vehicles.

Figure 2:
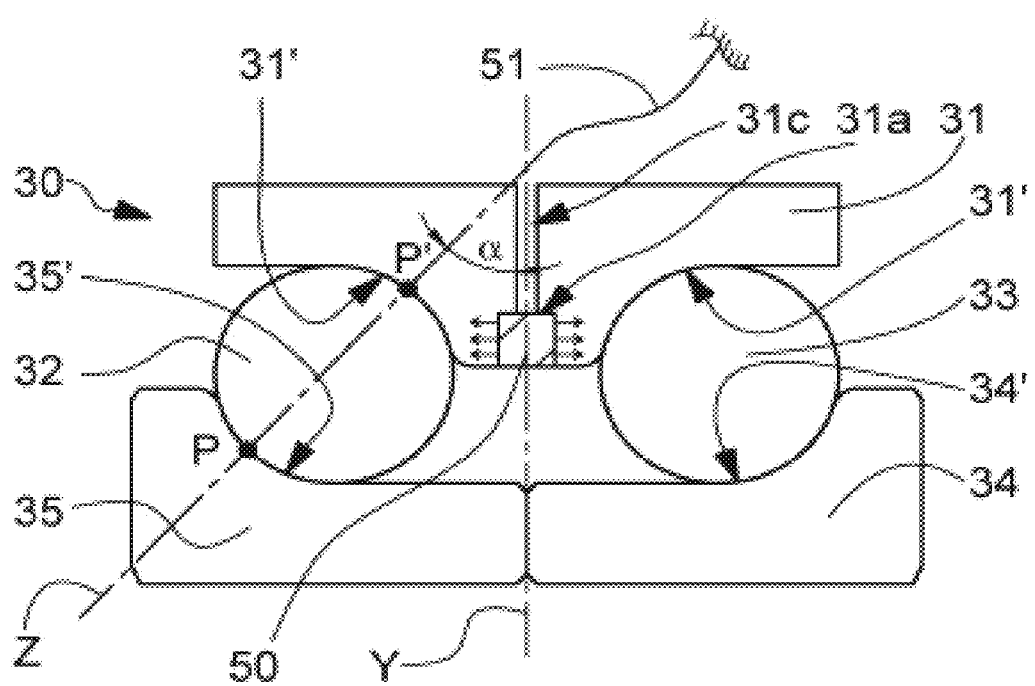
FIG. 2 is a sketch of an example of the bearing unit according to one embodiment of the present invention.

The group 10 comprises a hub 20, which is rotatable, and a bearing unit 30. The hub 20, as shown in FIG. 1, is configured so that it also acts as an inner raceway of the bearing. On the other hand, as shown in FIG. 2, it is also possible to use a pair of radially inner rings 34, 35, and according to this configuration the hub does not act as a raceway. In the remainder of the present description, reference will be made explicitly to the latter configuration, comprising two radially inner rings. Additionally, throughout the present description and in the claims, any terms and expressions indicating positions and orientations such as "radial" and "axial" are to be interpreted as relating to the central axis of rotation X of the bearing unit 30. However, expressions such as "axially outer" and "axially inner" relate to the assembled condition, and, in this particular case, preferably relate to one side of a wheel and to a side opposed to this side of the wheel, respectively.

Also, with reference to FIG. 2, the bearing unit 30 according to one embodiment of the present invention comprises a stationary radially outer ring 31, provided with respective radially outer raceways 31', a pair of rotatable radially inner rings 34, 35, provided with respective radially inner raceways 34' and 35', and two rows of rolling bodies 32, 33, which in this case are balls. The axially outer row of rolling bodies 32 is interposed between the radially outer ring 31 and the radially inner ring 35, in an axially outer position, while the axially inner row of rolling bodies 33 is interposed between the radially outer ring 31 and the radially inner ring 34, in an axially inner position. To simplify the graphic representation, the references 32, 33 will be given both to the individual balls and to the rows of balls. Also for simplicity, the term "ball" may be used by way of example in the present description and in the attached drawings in place of the more generic term "rolling bodies" (and the same reference numerals are also used). It is to be understood in all cases that the balls may be replaced by any other rolling bodies (such as rollers, tapered rollers, needle rollers, or the like).

The rolling bodies of the rows 32, 33 are held in position by corresponding cages 39, 40.

Returning to FIG. 1, the hub 20 forms at its axially inner end a rolled edge 22 which is configured to axially pre-load the inner ring 34, which is mounted on a radially outer surface 20" of the hub.

For completeness of description, the hub 20 also has an axially outer flange portion. The flange portion has a plurality of axial fixing holes. These holes are the seats for the same number of fixing means (such as captive bolts), which connect, in a known way, an element of the wheel of the motor vehicle, for example the brake disc (also of a known type), to the hub 20. All these characteristics are known in themselves and are therefore not shown in the attached drawings.

The components of the bearing unit 30, particularly the radially outer ring 31 and the raceways 31', the radially inner rings 34, 35 and the respective raceways 34', 35', as well as the rows 32, 33 of rolling bodies, are designed, as shown in FIG. 2, according to the current stands for bearings for wheel hub groups.

Figure 3:
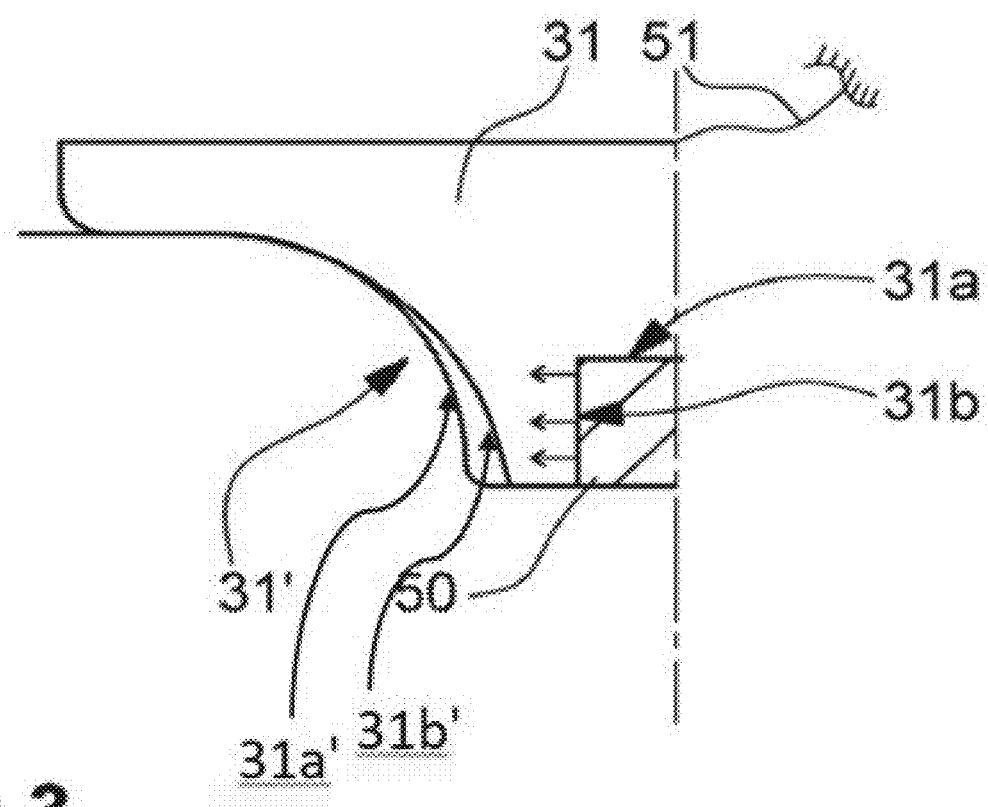
FIG. 3 is a detail of FIG. 2.

With reference to FIGS. 2 and 3, according to an embodiment of the invention, the bearing unit 30 is provided with a piezoelectric actuator 50 housed in a seat 31a of the radially outer ring 31, in a symmetrical position relative to the raceways 31'.

The application of a voltage to the piezoelectric actuator 50 causes a change in the length of the actuator, in the direction indicated by the arrows in FIGS. 2 and 3. The elongation of the piezoelectric actuator subjects the axial surfaces 31b of the seat 31a of the radially outer ring 31 to a different pressure, thereby modifying the strain behaviour of the radially outer ring 31 and its raceways 31'. As a result, the force transmitted between the raceways 31' and the rolling bodies 32, 33 is modified. The strain that is produced is a function of the specific driving conditions of the vehicle (straight or cornering).

The piezoelectric actuator 50 is connected by means of a wiring harness 51, which passes through a hole 31c in the radially outer ring 31, to a control unit (of a type which is known and therefore not shown in the figures) configured to monitor the conditions of movement of the vehicle and particularly its lateral acceleration. The control unit can therefore control the piezoelectric actuator, by supplying feedback to it, preferably by closed loop control.

The "active" internal geometry proposed by the present invention, with a radially outer ring capable of modifying its strain behavior and consequently the forces applied to the rolling bodies, provides real-time control of the key geometrical parameters, namely:

the pre-loading of the bearing, that is to say the pre-loading between the races and the rolling bodies;

the contact angle between the raceways and the rolling bodies in general, defined as the angle between the axis Y of axial symmetry between the radially inner rings 34, 35 and the axis Z passing through the points of contact P, P' between the rolling bodies and the respective raceways (in FIG. 2, by way of example, the raceway 31', the ball 32 and raceway 35');

the osculation, that is to say the ratio between the radius of curvature of the raceway and the diameter of the ball.

Such active control reduces the friction of the internal geometry while simultaneously matching the behavior of the bearing, in terms of mechanical strength, to the various driving conditions.

In particular, during straight driving, the bearing can operate in the "low friction" mode. This mode is taken to mean that the working curve, that is to say the contact curve, of the raceway 31' is as indicated by 31a' in FIG. 3. Thus, the pre-loading between the races and the rolling bodies is reduced, decreasing the contact angle between the rolling bodies and the respective raceways, and increasing the osculation. In these driving conditions, the reduction of pre-loading and therefore of the overall load capacity of the bearing is acceptable, since it provides the advantage of a lower force on the bearing, minimizing friction losses and thus enabling fuel savings to be made.

Conversely, during cornering, the bearing can operate in the "high friction" mode. This mode is taken to mean that the working curve, that is to say the contact curve, of the raceway 31' is as indicated by 31b' in FIG. 3. Thus, the pre-loading between the races and the rolling bodies is increased, in the same way as the contact angle between the rolling bodies and the respective raceways is increased, and the osculation is reduced. In these driving conditions, which usually last for a shorter time than straight driving, the need to accept higher friction is acceptable, because there is also an increase in pre-loading and therefore in the overall load capacity of the bearing, which is highly advantageous for the stability of the vehicle.

Evidently, the piezoelectric actuator may also be used as a sensor for monitoring the load capacity of the bearing. Thus a "smart" wheel hub group is provided.

The proposed solution provides considerable advantages: the use of the piezoelectric element as an actuator considerably reduces the friction of the bearings, while maintaining the same service life and the same mechanical strength, in the operating conditions of the vehicle, during cornering for example, when this is required.

Additionally, by using the piezoelectric element as a sensor the load conditions on the bearing can be constantly monitored.

In addition to the embodiments of the invention as described above, it should be understood that there are numerous other variants. It should also be understood that the embodiments are described purely by way of example, and do not limit the object of the invention, or its applications, or its possible configurations. On the contrary, although the above description enables a person skilled in the art to implement the present invention at least according to an example of configuration thereof, it should be understood that numerous variations of the components described could be devised without thereby departing from the object of the invention as defined in the attached claims, whether interpreted literally and/or according to their legal equivalents.

What is claimed is:

1. A rolling bearing of a wheel hub group for motor vehicles comprising:
   a radially outer stationary ring having corresponded radially outer raceways, wherein the radially outer stationary ring is a one-piece member;
   a pair of radially inner rotatable rings having correspondent radially inner raceways;
   two rows of rolling bodies accommodated between the radially inner raceways of the pair of radially inner rotatable rings and the radially outer raceways of the radially outer stationary ring,
   wherein the rolling bearing comprises a piezoelectric element accommodated in a seat provided within the radially outer stationary ring in a symmetrical position with respect to the radially outer raceways, and the piezoelectric element is configured to modify strain behavior of the radially outer stationary ring and the radially outer raceways based on subjecting axial surfaces of the seat to a pressure differential, the pressure differential being achieved based on change in length of the piezoelectric element upon application of voltage to the piezoelectric element.

2. The rolling bearing according to claim 1, wherein the piezoelectric element is further configured to,
   apply a variable pressure on axial surfaces of the seat of the radially outer stationary ring, and
   modify the strain behavior of the radially outer stationary ring and the radially outer raceways based on the application of the variable pressure.

3. The rolling bearing according to claim 1, wherein the piezoelectric element is electrically connected to a control unit by means of a wiring harness passing through a hole of the radially outer stationary ring.

4. The rolling bearing of a wheel hub group for motor vehicles of claim 1, wherein the radially outer stationary ring defines a through hole extending from the seat.

5. The rolling bearing of a wheel hub group for motor vehicles of claim 4, further comprising a wiring harness coupled to the piezoelectric element and extending through the through hole.

6. The rolling bearing of a wheel hub group for motor vehicles of claim 5, wherein the through hole extends from the seat in a radial direction.

7. A system for active control of a rolling bearing of a wheel hub group for motor vehicles comprising:
   a control unit,
   a wiring harness,
   a rolling bearing comprising,
      a radially outer stationary ring having corresponded radially outer raceways, wherein the radially outer stationary ring is a one-piece member,
      a pair of radially inner rotatable rings having correspondent radially inner raceways,
      two rows of rolling bodies accommodated between the radially inner raceways and the radially outer raceways,
      wherein
      the rolling bearing comprises a piezoelectric element accommodated in a seat provided within the radially outer stationary ring in a symmetrical position with respect to the radially outer raceways,
      the piezoelectric element is configured to modify strain behavior of the radially outer stationary ring and the radially outer raceways based on subjecting axial surfaces of the seat to a pressure differential, the pressure differential being achieved based on change in length of the piezoelectric element upon application of voltage to the piezoelectric element.

8. The rolling bearing of a wheel hub group for motor vehicles of claim 7, wherein the radially outer stationary ring defines a through hole extending from the seat.

9. The rolling bearing of a wheel hub group for motor vehicles of claim 8, wherein the wiring harness is coupled to the piezoelectric element and extends through the through hole.

10. The rolling bearing of a wheel hub group for motor vehicles of claim 9, wherein the through hole extends from the seat in a radial direction.

* * * * *